US012623597B2

(12) United States Patent
Witko

(10) Patent No.: US 12,623,597 B2
(45) Date of Patent: May 12, 2026

(54) DYNAMIC OUTPUTS FOR INDUCING INTERACTIONS WITH AUTONOMOUS VEHICLES

(71) Applicant: Applied Electric Vehicles Ltd, Scoresby (AU)

(72) Inventor: Aleks Witko, Mont Albert (AU)

(73) Assignee: Applied Electric Vehicles Ltd, Scoresby (AU)

( * ) Notice: Subject to any disclaimer, the term of this patent is extended or adjusted under 35 U.S.C. 154(b) by 140 days.

(21) Appl. No.: 18/607,124

(22) Filed: Mar. 15, 2024

(65) Prior Publication Data

US 2025/0289365 A1      Sep. 18, 2025

(51) Int. Cl.
*B60Q 9/00*         (2006.01)
*B60W 60/00*        (2020.01)
*G06Q 10/087*       (2023.01)

(52) U.S. Cl.
CPC ......... *B60Q 9/00* (2013.01); *B60W 60/00256* (2020.02); *G06Q 10/087* (2013.01); *B60Q 2800/10* (2022.05); *B60W 2554/20* (2020.02); *B60W 2554/4029* (2020.02); *B60W 2555/20* (2020.02)

(58) Field of Classification Search
CPC .... B60Q 1/507; B60Q 2800/10; B60Q 5/005; B60Q 9/00; B60W 2554/20; B60W 2554/4029; B60W 2555/20; B60W 60/00256; G06F 3/011; G06F 3/167; G06Q 10/087; G06V 20/56; G06V 20/58
See application file for complete search history.

(56) References Cited

U.S. PATENT DOCUMENTS

| | | | |
|---|---|---|---|
| 2015/0356665 A1* | 12/2015 | Colson ............... | G06Q 30/0635 |
| | | | 705/26.81 |
| 2018/0099602 A1 | 4/2018 | Salter et al. | |
| 2020/0070717 A1* | 3/2020 | Garden ................ | G09F 21/048 |
| 2025/0148217 A1* | 5/2025 | Sharifi ................ | G06N 3/0475 |

FOREIGN PATENT DOCUMENTS

WO      2025194007 A1      9/2025

OTHER PUBLICATIONS

"International Search Report and Written Opinion", International Application No. PCT/US25/19877, Jun. 11, 2025, 11 pages.

* cited by examiner

*Primary Examiner* — Omer S Khan
(74) *Attorney, Agent, or Firm* — FIG. 1 Patents

(57) ABSTRACT

Dynamic outputs for inducing interactions with autonomous vehicles is described. In one or more implementations, a system includes an output device configured to produce audible signals in an environment outside an autonomous vehicle, and at least one processor operatively coupled to the output device. The processor is configured to detect one or more characteristics of the environment, dynamically generate, based on the characteristics, an audio output for inducing human interactions with the autonomous vehicle, and cause the output device to transmit the audio output as the audible signals produced in the environment for facilitating a human interaction with the autonomous vehicle.

20 Claims, 5 Drawing Sheets

Figure 1:
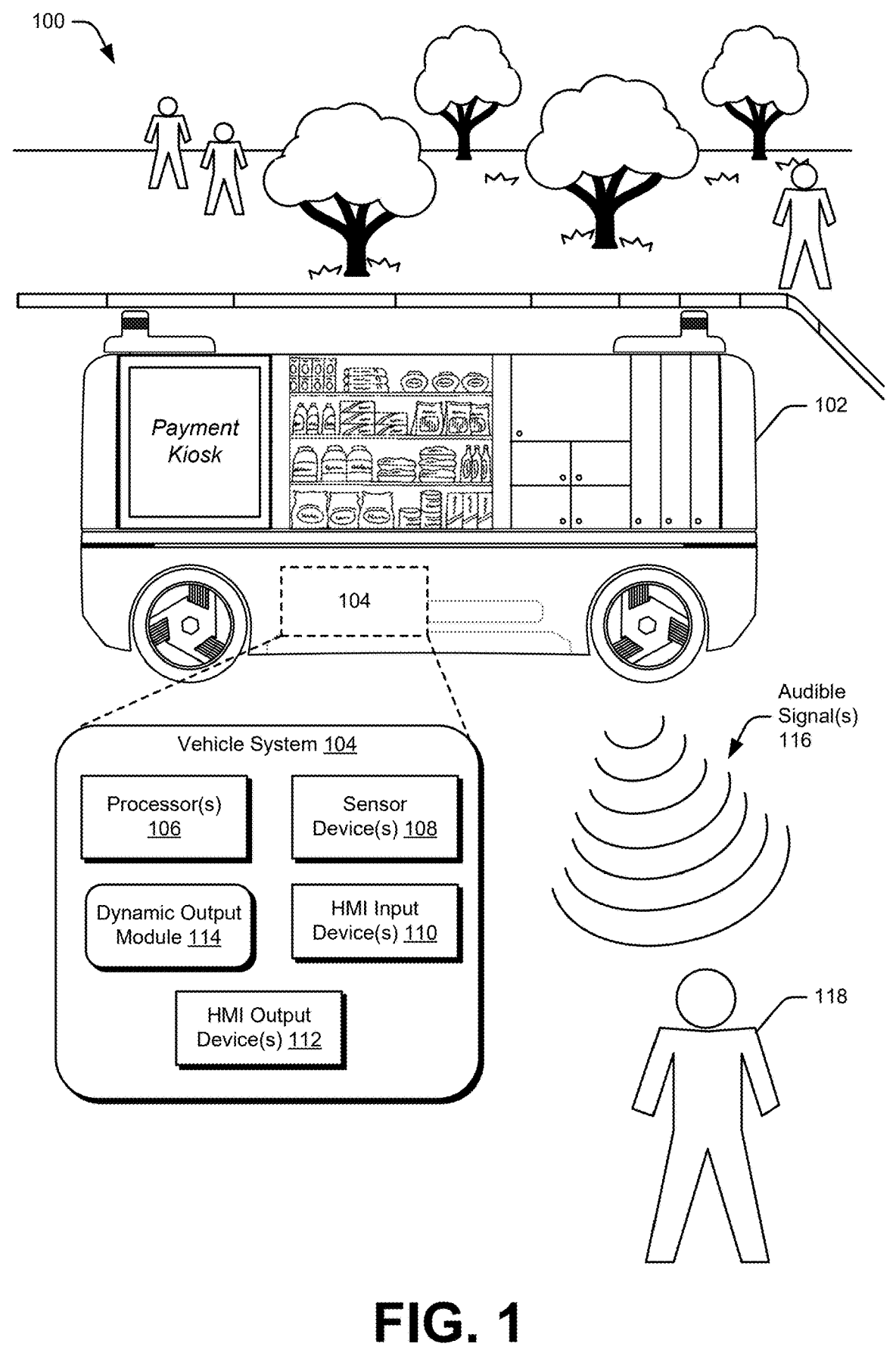

100

102

Payment
Kiosk

104

Audible
Signal(s)
116

Vehicle System 104

Processor(s)
106

Sensor
Device(s) 108

Dynamic Output
Module 114

HMI Input
Device(s) 110

HMI Output
Device(s) 112

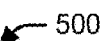

502
Detect one or more characteristics of an environment outside an autonomous vehicle 504
Based on the characteristics, dynamically generate an audio output for inducing human interactions with the autonomous vehicle 506
Cause an output device of the autonomous vehicle to transmit the audio output as audible signals produced in the environment for facilitating a human interaction with the autonomous vehicle

FIG. 5

DYNAMIC OUTPUTS FOR INDUCING INTERACTIONS WITH AUTONOMOUS VEHICLES

BACKGROUND

Autonomous vehicle technology is rapidly advancing to perform a diverse range of tasks, including for policing and security, passenger transport, and goods delivery. For example, a police department deploys a robotic ground vehicle to help with crowd control, to direct traffic safely through a congested intersection, or to enforce a security perimeter near a crash site. A merchant may send a robotic ground vehicle out to deliver goods (e.g., so called "last mile delivery") or provide other services to neighborhoods that are far away from a merchant's warehouse or store.

Despite their increasing deployment rates, people may find it unfamiliar to share roadways and sidewalks with robotic ground vehicles. In addition, many autonomous platforms operate silently due to their fully electric nature, which can mask their presence. Even though a pedestrian or vehicle occupant can communicate with drivers of traditional manned vehicles through voice, hand gestures, and body language, they might not know how to signal or make an autonomous system aware that a human is present. A sudden appearance of a near-silent, autonomous ground vehicle may startle pedestrians or occupants of other vehicles and cause even more uncertainty about how to engage with it. As such, challenges exist in designing effective interfaces that facilitate safe and pleasant human interactions with these autonomous machines.

BRIEF DESCRIPTION OF THE DRAWINGS

FIG. 1 is a block diagram of a non-limiting example environment including a vehicle that generates dynamic outputs for inducing interactions with autonomous vehicles.

FIG. 5 depicts a procedure for generating dynamic outputs for inducing interactions with autonomous vehicles.

DETAILED DESCRIPTION

Figure 2:
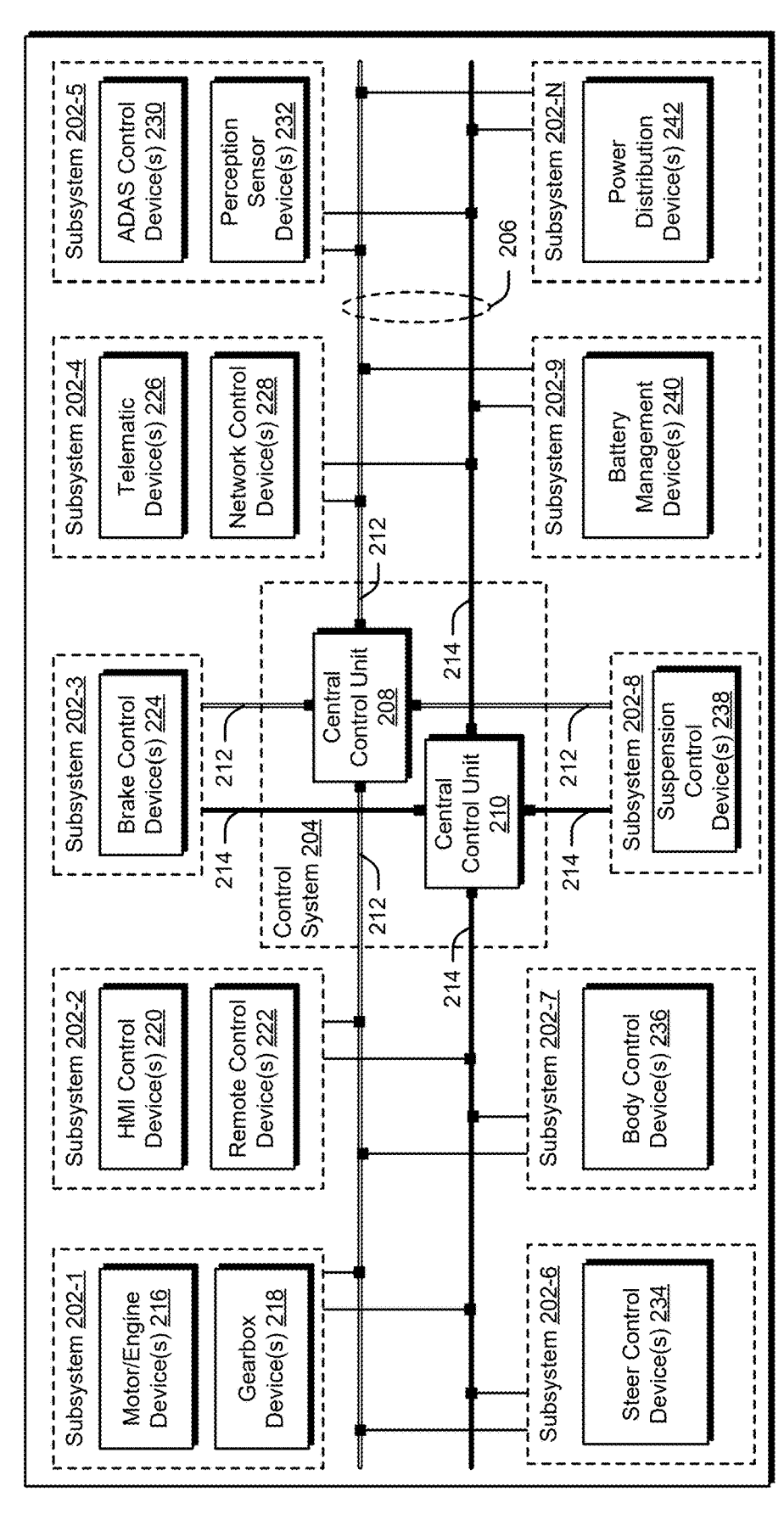
FIG. 2 is a block diagram of a non-limiting example of a vehicle system that generates dynamic outputs for inducing interactions with autonomous vehicles.

Autonomous vehicle technology is progressing at a fast rate, and not just to facilitate driving. Autonomous systems are being deployed to facilitate passenger transportation, as well as to help people perform work and complete everyday tasks.

For example, imagine a merchant that deploys an autonomous ground vehicle into a city. The autonomous vehicle may be programmed to travel to different neighborhoods and to make multiple stops throughout the city for delivering merchant goods or services. A first stop for the autonomous vehicle may be at a central park where families are having picnics or enjoying a playground. The autonomous vehicle arrives at the park with storage compartments filled with groceries (e.g., fresh baguettes, artisan cheeses, juicy strawberries) and other items for sale (e.g., towels, sunscreen, beverages, ice) to help make people's park experience more enjoyable.

Although autonomous vehicle deployments like these are becoming more common, not everyone is accustomed to interacting with a robotic ground vehicle. Many autonomous vehicle platforms are fully electric and operate in near silence, which can mask their presence and further impede human and vehicle interactions. Even if a pedestrian or vehicle occupant recognizes a robotic ground vehicle operating nearby, that person may not know how to signal the autonomous vehicle. For example, when the autonomous ground vehicle described above arrives at the central park, its presence may be masked by shrubs, trees, or other environmental features of the park (e.g., noise) and fail to gain the attention of customers. These and various other challenges in an environment can interfere with an autonomous system's ability to implement a human-machine-interface (HMI) that facilitates safe and effective human interactions.

An autonomous vehicle that has difficulty understanding or responding to human interactions may struggle with helping people to complete their work or tasks. Implementing an effective HMI that facilitates safe and effective human interactions with autonomous systems can be challenging.

In accordance with techniques of this disclosure, dynamic outputs for inducing interactions with autonomous vehicles is described. For example, an autonomous vehicle includes one or more output devices configured to produce audible and/or visual signals in an environment surrounding the vehicle. The output devices may include speakers, displays, lights, and other audio-visual output devices. The autonomous vehicle further includes one or more sensor devices configured to generate sensor data about one or more characteristics of the environment. For example, the sensor data indicates a person is approaching the vehicle, one or more pedestrians are walking past the vehicle, etc. The vehicle further includes at least one processor operatively coupled to the output devices and the sensor devices. For example, a control unit or other vehicle device executes one or more applications that perform functions based on the sensor data to generate the audible and visual signals that are then output from the output devices.

The processor on the vehicle uses the sensor data to detect one or more characteristics of the environment. For example, imagine that the vehicle is parked outside a concert venue with an inventory of merchandise (e.g., concert t-shirts, souvenirs) to sell to the concert goers on their way into and out of the venue. The concert venue may specify that the vehicle park in an empty lot that is adjacent to the venue and out of the way of fire lanes. As such, the vehicle may be obscured from view of at least some of the concert goers who do not walk past the vehicle and therefore, may miss an opportunity to purchase the merchandise being offered. The processor detects people in the vicinity and determines that none of the pedestrians appears to be walking toward the vehicle. The processor detects that one of the pedestrians is wearing red pants.

To entice the pedestrians to stop at the vehicle before or after attending the concert, the processor dynamically generates, based on the characteristics, audible and visual outputs for inducing human interactions with the autonomous vehicle. For example, the processor generates, in near-real time, a message for output to the pedestrians, such as "hey you in the red pants, skip the line inside and get your official concert t-shirts from here. There is no wait!" The message is synthesized as audible signals output from the speakers on the vehicle and directed to the pedestrians as they are walking. In other words, the processor on the vehicle causes the output devices to transmit the message as audible signals produced in the environment for facilitating a human interaction with the autonomous vehicle.

The processor on the vehicle may receive additional sensor data indicating that the concert goers have changed direction and are approaching the vehicle. In response to detecting the change in the characteristics of the environment, the processor generates (e.g., again in near-real time) another message for output to the pedestrians, such as "Good call! Step right up to my kiosk and pick out your merchandise-my inventory includes all sizes and styles." The people walk up to the vehicle and the vehicle detects further changes to the characteristics of the environment. For example, with the person in the red pants now among the pedestrians looking at the vehicle inventory, the processor generates a targeted message for output to the environment outside of the vehicle (e.g., "If you need help with color selections, black goes well with your red pants", "make your selection from my touchscreen and your product will be dispensed from the open drawer below").

In this way, human interactions with the vehicle are facilitated by audible and/or visual outputs projected into the environment outside the vehicle. By dynamically generating outputs, a person in vicinity of the vehicle is more likely to notice the vehicle and engage with it. The HMI implemented by the vehicle helps people to not just understand that they can engage with the autonomous vehicle, but also helps people know how to perform the engagement to complete a task.

In some aspects, the techniques described herein relate to a system including an output device configured to produce audible signals in an environment outside an autonomous vehicle, and at least one processor operatively coupled to the output device and configured to detect one or more characteristics of the environment, dynamically generate, based on the characteristics, an audio output for inducing human interactions with the autonomous vehicle, and cause the output device to transmit the audio output as the audible signals produced in the environment for facilitating a human interaction with the autonomous vehicle.

In some aspects, the techniques described herein relate to a system, wherein the at least one processor is further configured to: detect a change to the characteristics in response to the audio output, and modify the audio output based on the change for further inducing the human interactions with the autonomous vehicle.

In some aspects, the techniques described herein relate to a system, wherein the at least one processor is further configured to use machine-learning to determine different outputs for inducing human interactions with the autonomous vehicle in two or more different environments.

In some aspects, the techniques described herein relate to a system, wherein the at least one processor is further configured to: dynamically generate the audio output to be a first type of audio generated for a first environment of the two or more different environments, and dynamically generate the audio output to be a different type of audio generated for a second environment of the two or more different environments.

In some aspects, the techniques described herein relate to a system, wherein the at least one processor is further configured to: determine an inventory of items transported by the autonomous vehicle, and dynamically generate the audio output for inducing human interactions with the autonomous vehicle based further on the inventory.

In some aspects, the techniques described herein relate to a system, wherein the at least one processor is further configured to: determine a location of the environment, and dynamically generate the audio output for inducing human interactions with the autonomous vehicle based further on the location.

In some aspects, the techniques described herein relate to a system, wherein the at least one processor is further configured to: determine that one or more of the items being transported by the autonomous vehicle are removed from the inventory, and dynamically generate an additional audio output for indicating feedback about the one or more items that are removed from the inventory.

In some aspects, the techniques described herein relate to a system, wherein the at least one processor is further configured to: receive messages from a large language model configured to dynamically generate text, and synthesize the messages as the audio output for inducing human interactions with the autonomous vehicle.

In some aspects, the techniques described herein relate to a system, wherein the characteristics detected by the at least one processor include information about time of day for the environment.

In some aspects, the techniques described herein relate to a system, wherein the characteristics detected by the at least one processor include information about weather detected in the environment.

In some aspects, the techniques described herein relate to a system, wherein the characteristics detected by the at least one processor include information about one or more human objects detected in the environment, including position of the human objects, motion of the human objects, shape of the human objects, and size of the human objects.

In some aspects, the techniques described herein relate to a system, wherein the information about one or more human objects include information obtained from a cloud service or platform indicative of one or more of personal preferences, a social media presence, and previous vehicle interactions.

In some aspects, the techniques described herein relate to a system, wherein the characteristics detected by the at least one processor include information about one or more inanimate objects detected in the environment, and the inanimate objects include at least one of other vehicles, buildings, driving surfaces, sidewalks, signs, awnings, flags, trees, or rocks.

In some aspects, the techniques described herein relate to a system, further including: a sensor system configured to generate sensor data indicative of the characteristics detected by the at least one processor.

In some aspects, the techniques described herein relate to a system, wherein the sensor system includes one or more of a camera sensor, a lidar sensor, a radar sensor, an ultrasonic sensor, a location positioning sensor, a temperature sensor, a pressure sensor, and a communication sensor.

In some aspects, the techniques described herein relate to a system, wherein the output device includes a first output device, the system further including: a second output device configured to produce visual signals in the environment from a position inside or outside the autonomous vehicle, wherein the at least one processor is operatively coupled to the second output device and further configured to: dynamically generate, based on the characteristics, a visual output for inducing the human interactions with the autonomous vehicle, and cause the second output device to transmit the visual output as the visual signals produced in the environment for facilitating the human interaction with the autonomous vehicle.

In some aspects, the techniques described herein relate to a system, wherein the at least one processor is configured to control the first output device and the second output device to simultaneously transmit the audio output and the visual output in the environment for facilitating the human interaction with the autonomous vehicle.

In some aspects, the techniques described herein relate to an autonomous vehicle including: a first output device configured to produce audible signals in an environment outside an autonomous vehicle, a second output device configured to produce visual signals in the environment outside the autonomous vehicle, and at least one processor operatively coupled to the first output device and the second output device, and configured to: detect one or more characteristics of the environment, dynamically generate, based on the characteristics, audible and visual outputs for inducing human interactions with the autonomous vehicle, and cause the first output device and the second output device to simultaneously transmit the audible and visual outputs as the audible signals and the visual signals produced in the environment for facilitating a human interaction with the autonomous vehicle.

In some aspects, the techniques described herein relate to a computer-readable storage medium including instructions that, when executed, cause at least one processor of an autonomous vehicle to: detect one or more characteristics of an environment outside the autonomous vehicle, dynamically generate, based on the characteristics, an audio output for inducing human interactions with the autonomous vehicle, and cause an output device of the autonomous vehicle to transmit the audio output as audible signals produced in the environment for facilitating a human interaction with the autonomous vehicle.

In some aspects, the techniques described herein relate to a computer-readable storage medium, wherein the computer-readable storage medium is installed in the autonomous vehicle.

FIG. 1 is a block diagram of a non-limiting example environment 100 including a vehicle that generates dynamic outputs for inducing interactions with autonomous vehicles. The environment 100 includes any type of vehicle operating environment, such as a roadway, a traffic scenario, an off road area (e.g., a construction site, a mining operation, a recreational area), in the air, on or in the water, on or in other substances (e.g., within fluids and/or cellular material), in space, and other public or private spaces, to name a few. The environment 100 includes a vehicle 102, which may be any type of vehicle including ground vehicles (e.g., trucks, cars, vans, tractor-trailers, tanks), air vehicles, rail vehicles, marine vehicles, space vehicles, or other vehicle types. The vehicle 102 in at least one example is unmanned (e.g., autonomously controlled, remotely controlled), and in at least one other example the vehicle 102 is manned (e.g., semi-autonomously controlled, at least partially human operated).

The vehicle 102 includes a vehicle system 104. The vehicle system 104 generally includes multiple electronic systems configured to interface with electro-mechanical components of the vehicle 102 to implement processor-based vehicle functions and processor-driven operations, such as for driving or maneuvering the vehicle 102 in the environment 100.

The vehicle system 104 includes one or more processors 106, one or more sensor devices 108, one or more HMI input devices 110, one or more HMI output devices 112, and a dynamic output module 114. These components configure the vehicle system 104 to produce an external user interface on the vehicle 102, including one or more audible signals 116 projected outside the vehicle 102, for facilitating a human interaction with the vehicle 102 and a user 118 in the environment 100.

In at least one example, the processors 106 are electronic circuits that process instructions for executing functions on the vehicle 102. Execution of the functions enables the processors 106 to implement vehicle operations for achieving smooth and safe driving by the vehicle 102 and for facilitating safe human interactions with the vehicle 102. Examples of the processors 106 include but are not limited to a central processing unit (CPU), a graphics processing unit (GPU), a field programmable gate array (FPGA), an accelerator, an accelerated processing unit (APU), a system on chip (SoC), a microcontroller, an electronic control unit (ECU), and a digital signal processor (DSP), to name a few. In one or more variations, the processors 106 include multiple co-processors, multiple cores (e.g., a multi-core processor). In one or more other variations, the processors 106 include just one core (e.g., a single processor core).

The processors 106 rely on a memory (not shown in FIG. 1) to store the instructions for execution by the processors 106 that cause the vehicle 102 to implement vehicle functions. For example, the vehicle 102 includes a memory circuit that stores instructions and data for executing a program (e.g., software, firmware). In one or more implementations, the memory corresponds to semiconductor memory where data is stored within memory cells on one or more integrated circuits. The memory of the processors 106 is used to store information, such as for generating dynamic outputs for facilitating human interactions with the vehicle 102. In at least one example, the memory of the processors 106 corresponds to or includes volatile memory, examples of which include random-access memory (RAM), dynamic random-access memory (DRAM), synchronous dynamic random-access memory (SDRAM), static random-access memory (SRAM), and memristors. The memory of the processors 106 is configurable with any number of memory (e.g., physical memory) without departing from the spirit or scope of the described techniques. Alternatively or in addition, the memory of the processors 106 corresponds to or includes non-volatile memory, examples of which include flash memory, read-only memory (ROM), programmable read-only memory (PROM), erasable programmable read-only memory (EPROM), electronically erasable programmable read-only memory (EEPROM), and non-volatile random-access memory (NVRAM), such as phase-change memory (PCM) and magneto resistive random-access memory (MRAM). Further examples of memory configurations include low-power double data rate (LPDDR), also known as LPDDR SDRAM. The memory of the processors 106 is configurable in a variety of ways capable of supporting vehicle controls.

The sensor devices 108 are vehicle components configured to detect characteristics of the environment 100 including changes to the characteristics. In one or more examples, the sensor devices 108 represent a sensor system that includes one or more of a camera sensor, a lidar sensor, a radar sensor, an ultrasonic sensor, a location positioning sensor, a temperature sensor, a pressure sensor, a communication sensor, or other type of sensor.

In at least one example, the sensor devices 108 include a camera and the sensor data output from the sensor devices 108 includes one or more images of the environment 100. These images may be still images, video images, thermal images, color enhanced images (e.g., low-light images, night vision images), or other types of images. The sensor devices 108 may be configured to capture different perspectives of the environment 100, which are used for various purposes including to derive the characteristics of the environment 100. For example, the images taken by a camera of the sensor devices 108 are surround-view images that provide partial or complete panoramic views of the environment 100 from the perspective of the vehicle 102. The images captured by the camera may include object detection images for determining whether an object outside the vehicle 102 is a pedestrian, cyclist, other vehicle, road sign, building, driving surface, sidewalk, awning, flag, tree, rock, or other object. In one or more implementations, the images captured by cameras of the sensor devices 108 are used for vehicle localization (e.g., autonomous driving functions, lane-centering functions, navigation functions).

The sensor devices 108 may include a lidar device, a radar device, or an ultrasonic device. For example, rather than images of the environment 100, the lidar, radar, and/or ultrasonic devices produce measurement data for identifying objects in the environment 100 and characteristics associated with the objects. As a lidar device, the sensor devices 108 may output a lidar point cloud as measurement data. As a radar device the sensor devices 108 may output a radar data cube as measurement data. The measurement data can include an object size, an object distance, an object shape, an object classification, an object position, an object orientation, an object direction, an object speed, or other object measurement.

The sensor devices 108 are operable to generate sensor data for consumption by the processors 106, and the processors 106 are operable to detect the characteristics of the environment 100 based on the sensor data output from the sensor devices 108. Examples of the characteristics detected from the environment 100 are numerous. Some non-limiting examples of the characteristics of the environment 100 include information about time of day for the environment 100, information about weather detected in the environment 100, and a location of the vehicle 102 in the environment 100. In one or more examples, the characteristics of the environment 100 indicate information about businesses, neighborhoods, parks, places of worship, government centers, military installations, community centers, and other structures near the vehicle 102. In one or more implementations, the characteristics of the environment 100 include information about one or more human objects detected in the environment 100 (e.g., the user 118), including position of the human objects, motion of the human objects, shape of the human objects, and size of the human objects. Other identifying information (e.g., age, gender, wardrobe) of human objects detected in the environment 100 represent additional characteristics of the environment 100. In at least one implementation, the characteristics of the environment 100 include information about one or more inanimate objects detected in the environment 100. For example, the inanimate objects detected in the environment 100 include other vehicles, buildings, driving surfaces, sidewalks, signs, awnings, flags, trees, or rocks. The information about inanimate objects detected in the environment 100 may include position of the inanimate objects, motion of the inanimate objects, shape of the inanimate objects, and size of the inanimate objects. Objects, whether human or inanimate objects, may be classified (e.g., as a person, car, cyclist, child, animal) and used as a characteristic of the environment 100 for generating dynamic outputs from the vehicle 102.

The HMI input devices 110 are components of the vehicle 102 that are configured to receive input from users of the vehicle 102. In this example, a user of the vehicle 102 includes people who interact with the vehicle 102, such as passengers (e.g., occupants of the vehicle) or pedestrians (e.g., people in the environment 100 who are outside the vehicle 102). For example, the user 118 is a pedestrian in proximity of the vehicle 102. Some non-limiting examples of the HMI input devices 110 include microphones configured to detect voice inputs from the user 118, cameras or sensors configured to detect gesture inputs or body language from the user 118, and touchscreens configured to detect tactile (e.g., touch) input from the user 118.

The HMI output devices 112 are components of the vehicle 102 that are configured to output information to users of the vehicle 102, such as the user 118, other pedestrians, or occupants of the vehicle 102. One non-limiting example of the HMI output devices 112 include speakers configured to produce the audible signals 116 in the environment 100 outside the vehicle 102. Another non-limiting example of the HMI output devices 112 include a display or lights configured to produce visual signals in the environment 100 outside the vehicle 102. For example, a display device of the HMI output devices 112 is configured to generate a graphical user interface (GUI) or control lights to convey information to the user 118.

In one or more examples, the HMI input devices 110 and the HMI output devices 112 are integrated in an HMI subsystem, such as an infotainment system. For example, the HMI input devices 110 and the HMI output devices 112 are accessible to occupants of the vehicle 102 to provide input and receive outputs from an in-vehicle display that is controlled via touch input, voice input, and/or buttons, knobs, and switches in the vehicle 102. Although depicted as part of the vehicle 102, in one or more examples, the HMI input devices 110 and the HMI output devices 112 communicate with external devices (e.g., mobile phones, smart watches) to transmit user outputs and receive user inputs at the vehicle system 104 based on user interactions with the external devices.

The dynamic output module 114 is configured to dynamically generate outputs (i.e., dynamic outputs) that are transformed by the HMI output devices 112 as signals (e.g., the audible signals 116) output in the environment 100 for inducing human interactions with the vehicle 102. The dynamic output module 114 may be implemented using one or more of hardware, software, and firmware. For example, the dynamic output module 114 is an application executed by the processors 106 to dynamically generate (e.g., in near real-time) audio outputs and/or visual outputs that are broadcast by the HMI output devices 112 into the environment 100.

In accordance with techniques of this disclosure, the dynamic output module 114 generates dynamic outputs for inducing interactions with the vehicle 102. For example, imagine that the vehicle 102 is deployed by a merchant to sell merchandise, groceries, or other items in the environment 100, which is near a city park. The vehicle 102 has compartments or pods for transporting goods to the environment 100, e.g., after the items are loaded into the vehicle 102 at a warehouse. In the environment 100, families may be having picnics, playing games, climbing on and around playground equipment, etc. to enjoy their afternoon. The vehicle 102 arrives at the park with its storage compartments filled with items for sale (e.g., refreshments, snacks, groceries, condiments, blankets, towels, umbrellas, sunscreen, ice) to help make park experiences more enjoyable. The user 118 may be among the families within the park when the vehicle 102 arrives.

Upon arrival at the park, the vehicle 102 may be obscured from view by the user 118. For example, a view of the vehicle 102 is obstructed by trees, shrubs, or other objects positioned between the user 118 and the vehicle 102. If the vehicle 102 is electrically propelled to the park, there may be little to no audible sound from the vehicle 102 to signal the arrival of the vehicle 102. Unless the user 118 happens to walk towards the vehicle 102 or change their perspective relative the location where the vehicle 102 is parked, the vehicle 102 may remain unnoticeable.

To draw attention of the customers to the vehicle 102, the audible signals 116 are output from the HMI output devices 110 to indicate that the vehicle 102 is nearby. To generate the audible signals 116, the dynamic output module 114 infers one or more characteristics of the environment 100. For example, as the dynamic output module 114 executes on the processors 106, sensor data is received from the sensor devices 108. Based on the sensor data, the dynamic output module 114 detects one or more characteristics of the environment 100. As one example, the characteristics of the environment 100 indicate that multiple inanimate objects are detected in proximity to the vehicle 102, however, no humans are located close by. Additionally, or alternatively, the sensor data may indicate a distance between the vehicle 102 and the nearest observable picnickers in the park. As other example characteristics of the environment, the sensor data may indicate a temperature or weather conditions of the environment 100.

As the dynamic output module 114 executes, an audio output is automatically produced based on the characteristics for signaling to park patrons that the vehicle 102 is nearby. Said differently, the dynamic output module 114 dynamically generates, based on the characteristics, an audio output for inducing human interactions with the vehicle 102. For example, the dynamic output module 114 uses a machine-learning model executing on the processors 106 to synthesize in near-real time an audible message, a soundscape, a melody, or other sounds that indicate a purpose of the vehicle 102 that is present at the park. The machine-learning model may tailor the sounds to have sufficient volume or to be directed in a particular way for improving a likelihood of being heard by the people in the park. The audio output is tailored by the dynamic output module 114 to fit the characteristics of the environment 100. In at least one example, other output signals accompany the synthesized sounds to further attract customers to the vehicle 102. For example, lights on the vehicle 102 may flash or display a light show to further signal the presence of the vehicle 102.

With the audio output generated by the dynamic output module 114, the HMI output devices 112 are controlled such that the audio output is transmitted as the audible signals 116 produced in the environment 100 for facilitating a human interaction with the vehicle 102. For example, the HMI output devices 112 output the audible signals 116 to include playing music (e.g., a song, a melody, a jingle) and/or broadcasting synthesized voice messages (e.g., "get your cold drinks and snacks from the mobile delivery vehicle in the East parking lot"). The audio output may be prefaced with a marketing phrase tailored for the characteristics of the environment. For example, when the characteristics indicate a hot day at the park, the audio output is prefaced with a phrase "tired of being hot."

At first, the audible signals 116 may go unheard by the park patrons. Eventually, the user 118 may hear the audio output transmitted from the vehicle 102 and decide to check out what the vehicle 102 has to offer for sale. As the user 118 moves closer to the vehicle 102, the sensor data captured by the sensor devices 108 outputs information indicating a person (e.g., the user 118) moving near the vehicle 102. The movement of the user 118 or change in distance between the vehicle 102 and the user indicates an example of a change in the characteristics of the environment 100.

In response to the change in the characteristics, the dynamic output module 114 may produce a new audio output that is better tailored for the changing situation. For example, the new audio output may be specified to be transmitted with a lower volume so as not to annoy the user 118. The new audio output generated by the dynamic output module 114 can include a different song, a different sound, or a different synthesized message. For example, the HMI output devices 112 output the new audio output as the audible signals 116 to welcome the user 118 or encourage the user 118 to keep moving to the vehicle 102 (e.g., "step right up", "we have something for everyone"). If the user 118 is among one of the first customers on that day, the audible message may indicate a sale or promotion (e.g., "enjoy a free frisbee for making the first purchase today") for the items provided by the vehicle 102.

When the user 118 is near the vehicle 102, another change in the characteristics is detected. For example, the sensor data processed by the dynamic output module 114 indicates a person is less than one meter from the vehicle 102 and the user 118 is facing the vehicle 102. Based on the sensor data indicating the change in the characteristics, the dynamic output module 114 may further tailor the audio output for the changing situation. For example, the audio output may ask the user a question (e.g., "how can I help you") or provide instructions on how to purchase and pay for items on the vehicle 102.

In this way, dynamic audio outputs are automatically transmitted from the vehicle 102 to help facilitate safe and effective human interactions. The vehicle 102 generates the audible signals 116 as outputs to communicate with users, not just to cause the users to notice the vehicle 102, but also to help the users understand that the vehicle 102 (e.g., items on the vehicle) can help them complete their work or finish tasks (e.g., have a fun day at the park).

FIG. 2 is a block diagram of a non-limiting example of a vehicle system that generates dynamic outputs for inducing interactions with autonomous vehicles. For ease of description, the vehicle system 200 is described in the context of the environment 100 shown in FIG. 1 including with reference to similar labeled elements. For example, the vehicle system 200 is a more-detailed version of the vehicle system 104 installed in the vehicle 102. The vehicle system 200 includes a plurality of subsystems 202 (labeled individually as subsystem 202-1 through subsystem 202-N, where N is any integer) that are managed by a control system 204 to implement various vehicle functions. In at least one example, the vehicle system 200 includes additional or fewer subsystems 202 than those depicted in FIG. 2.

The control system 204 is configured as a centralized controller that enables information to transfer between the subsystems 202 over a network 206. By exchanging information with the subsystems 202, the control system 204 causes the subsystems 202 to execute subsystem functions that enable driving or delivering messages to people in a vicinity of the vehicle 102 (e.g., in the environment 100). For instance, the control system 204 receives signals output on the network 206 from one of the subsystems 202, and based on information inferred from the signals, the control system 204 outputs additional signals on the network 206 to cause a particular behavior of another of the subsystems 202

(e.g., to cause one or more of the subsystems 202 to broadcast the audible signals 116).

The control system 204 includes a central control unit 208 and a central control unit 210. The central control unit 208 and the central control unit 210 represent separate processors, processor cores, control units, microcontrollers, system on chips, or other processor technology. For example, the central control unit 208 and the central control unit 210 are examples of the processors 106. Each of the central control unit 208 and the central control unit 210 are configured to execute instructions either as software or firmware to implement functionality of the control system 204. Although not shown, in some examples, the control system 204 includes a non-transitory computer-readable storage medium (e.g., data store, cache, static memory, dynamic memory, flash memory, disk storage) that maintains the instructions and data for implementing the instructions executed by each of the central control unit 208 and the central control unit 210. For example, the central control unit 208 and the central control unit 210 include respective data stores that contain the instructions, which upon retrieval from the data stores, are executed during operation of the vehicle 102. In one or more examples, data and instructions for implementing the dynamic output module 114 are executed by one or more of the central control unit 208 and the central control unit 210.

In another implementation, the control system 204 is distributed throughout the vehicle system 200 in two or more locations. In such a distributed implementation, the central control unit 208 is included in a first part of the control system 204 arranged at one part of the vehicle 102 (e.g., a front portion) and the central control unit 210 is included in a second part of the control system 204 positioned at another part of the vehicle 102 (e.g., a rear portion). In other distributed implementations, each part of the control system 204 includes one or more multiple instances of the central control unit 208 and/or the central control unit 210.

In one or more examples, the central control unit 208 and the central control unit 210 are functionally redundant. For example, the processors of each of the central control unit 208 and the central control unit 210 are operable to concurrently receive a same set of inputs from the subsystems 202 and concurrently send a same set of outputs to the subsystems 202. In a similar way, the processors of each of the central control unit 208 and the central control unit 210 are operable to concurrently receive the same set of inputs from the subsystems 202 and concurrently send the same set of outputs to the subsystems 202 regardless of whether that processor is being used to actively control operations of the vehicle 102.

The subsystems 202 of the vehicle system 200 rely on equivalent control operations of either the central control unit 208 or the central control unit 210 (e.g., one at a time) to actively cause vehicle operations or vehicle functions to be performed by the subsystems 202. For example, while the central control unit 208 is orchestrating operations of the subsystems 202, the central control unit 210 is maintained in a ready, standby state. If the central control unit 208 fails, then the control system 204 activates the central control unit 210 to take over and manage the subsystems 202 where the central control unit 208 left off. When the central control unit 210 takes over, the vehicle 102 may be forced to operate in a safe state, which can include maneuvering away from other vehicles, objects, and pedestrians to come to a controlled stop. This way, the functional redundancy implemented by the central control unit 208 and the central control unit 210 help the control system 204 to satisfy requirements for reliability and safety. In such implementations, the central control unit 208 and the central control unit 210 may be located at different locations within the vehicle.

The network 206 represents any suitable vehicle network technology, including wired and wireless signal propagation mediums. The network 206 enables real-time data exchange, safety enhancements, and efficient traffic management among the components of the vehicle system 200. The network 206 can include various switches, routers, transceivers, controllers, chokes, filters, terminations, and other networking equipment beyond transmission lines, cables, wires, busses, and other signal routing technologies. In an aspect, the network 206 adheres to an in-vehicle networking protocol. For example, the network 206 represents a combination of one or more of a controller area network (CAN), an automotive ethernet network (AEN), serializer/deserializer (SerDes) network, local interconnect network (LIN), or a FlexRay network (FRN).

In at least one example, to implement the redundancy of the control system 204, the network 206 is composed of dual physical network paths or network channels. In at least one example, the central control unit 208 and the central control unit 210 are operable to concurrently exchange a same set of inputs and outputs with the subsystems 202 over different respective channels (e.g., logical channels, physical channels) of the network 206 that link the subsystems 202 to that central control unit (e.g., the processors 106). A network channel 212 or network path communicatively couples each of the subsystems 202 to the central control unit 208. A separate network channel 214 or network path communicatively links each of the subsystems 202 to the central control unit 210. For example, the network channel 212 is utilized by the central control unit 208 to exchange data over the network 206, and the network channel 214 is utilized by the central control unit 210 to exchange data over the network 206. In at least one implementation, if a failure at the central control units 208 is at least partially caused by a fault in the network channel 212, the central control unit 210 is unaffected by the network fault and operable to communicate with the subsystems 202 using the network channel 214. The functional redundancy implemented by the network channel 212 and the network channel 214 further helps the control system 204 to satisfy the requirements for reliability and safety.

In at least one other example, to implement the redundancy of the control system 204, the network 206 is composed of dual logical network paths or channels. The network channel 212 and the network channel 214 may be separate logical paths through the network 206 that communicatively link each of the subsystems 202 to the central control unit 208 and the central control unit 210 using the same physical wires. In at least one example, the central control unit 208 and the central control unit 210 are operable to interleave a same set of inputs and outputs concurrently exchanged with the subsystems 202 over a same set of channels (e.g., logical or physical channels) of the network 206 that link the subsystems 202 to that central control unit (e.g., the processors 106). For example, communications two and from the central control unit 208 and the central control unit 210 are interleaved on a single set of wires that make up the network 206. If a failure at the central control unit 210 and/or the network channel 214 occurs, communications from the central control unit 208 can reach the subsystems 202 using the network channel 212. The functional redundancy implemented by interleaving the network channel 212 and the network channel 214 further helps the control system 204 to satisfy the requirements for reliability and safety.

The subsystems 202 include one or more edge devices (e.g., the sensor devices 108, the HMI input devices 110, the HMI output devices 112) operatively coupled to the network 206 to provide information to the control system 204 and receive commands from the control system 204 to implement various vehicle functions. For example, each of the subsystems 202 can include one or more actuators, microcontrollers, machines, or other equipment to perform specific vehicle tasks at the discretion of the edge devices that are contained within the subsystems 202. The sensor devices 108, the HMI input devices 110, the HMI output devices 112 may be included among one or multiple of the subsystems 202.

A subsystem 202-1 is a propulsion or drive subsystem. Motor/engine devices 216 of the subsystem 202-1 represent edge devices managed by the control system 204 to command vehicle propulsion units (e.g., an engine, a motor) to execute driving functions of the vehicle 102 (e.g., forward motion, reverse motion, acceleration, deceleration). In one or more examples, the motor/engine devices 216 manages operations of an engine of the vehicle 102, including fuel injection, ignition timing, emissions control, and engine health monitoring. In at least one aspect (e.g., in context of electric vehicles), the motor/engine devices 216 control inverters and motors that convert electric energy into mechanical energy for applying torque to wheels.

In addition, the subsystem 202-1 includes gearbox devices 218. Also referred to as a powertrain control module (PCM) and/or a transmission control module (TCM), transmission and gearbox functions are overseen by the gearbox devices 218 to implement an automatic transmission, optimize gear changes (e.g., gear shifts), and control torque delivered to the wheels of the vehicle 102. A vehicle may include one or more instances of the subsystem 202-1 (e.g., one subsystem 202-1 for each axle).

A subsystem 202-2 is an HMI subsystem. The subsystem 202-2 includes one or more HMI control devices 220 that implement a vehicle user interface. For example, the HMI control devices 220 include the HMI input devices 110, the HMI output devices 112, and other HMI devices. The vehicle user interface enables interaction between occupants (e.g., driver, passenger) of the vehicle 102 and the vehicle system 200, which enables human intervention in vehicle functions and driving. The vehicle user interface further enables interaction between people outside the vehicle (e.g., the user 118) and the vehicle system 200. For example, the HMI control devices 220 control the HMI output devices 112 (e.g., vehicle displays, vehicle dash clusters, head-up display units, haptic feedback, audible feedback, and other visual driving aids interpreted by the occupants to help with driving or ensuring safe vehicle operations). In one or more implementations, the HMI control devices 220 control the HMI input devices 110 to provide a human-interface to effect delivery of items or inventory made available from the vehicle 102, or vehicle operations, such as climate controls (e.g., heating, cooling), cabin features (e.g., infotainment, lighting), other vehicle body features (e.g., windshield wipers, transmission settings, suspension settings, drive mode selection, power seating, power mirrors, power door locks).

The subsystem 202-2 also includes one or more remote control devices 222 that allow human or machine inputs to control the vehicle 102 from outside the cabin. For example, in an autonomous or semi-autonomous vehicle context, the remote control devices 222 receive commands over a communication link with a base station (e.g., a mobile phone, a key fob, a remote computing system) to allow a human or machine operator to control the vehicle 102 as if the driving commands are provided directly to the HMI control devices 220. In hot or cold weather, to pre-cool or pre-heat the cabin, the remote control devices 222 activate remote starting functions. The remote control devices 222 in at least one aspect allow door locks to be unlocked or locked and doors, tailgates, or trunks to be remotely opened or closed.

A subsystem 202-3 represents a braking subsystem of the vehicle system 200. For example, one or more brake control devices 224 are operable to manage anti-lock braking systems (ABS), electronic stability controls (ESC), and otherwise convert driver inputs at the HMI control devices 220 to effect performance of vehicle brakes (e.g., for stopping, for decelerating). In some examples, the brake control devices 224 represent a braking control module (BCM).

Another of the subsystems 202 depicted in FIG. 2 includes a subsystem 202-4, which is an onboard-vehicle communication subsystem. The subsystem 202-4 manages telematics and communications that occur within the vehicle 102, and with other devices located outside the vehicle 102. For example, the subsystem 202-4 interfaces with the various edge devices coupled to the network 206 to ensure healthy exchange of data that is free of errors or faults. In addition, the subsystem 202-4 interfaces with other vehicles, mobile devices, infrastructure, and remote computing systems to implement various vehicle functions. One or more network control devices 228 of the subsystem 202-4 monitor network health of the network 206 and facilitate communication protocols implemented therein. The network control devices 228 are configured to diagnose problems with the network 206 to reroute signals and prevent data loss.

One or more telematic devices 226 of the subsystem 202-4 handle offboard communications of the vehicle 102. This includes implementing vehicle-to-vehicle (V2V) and vehicle-to-everything (V2X) communications that enable the vehicle 102 to communicate with other intelligent vehicles and systems in an operating environment (e.g., on or near a roadway). The telematic devices 226 interface with over-the-air (OTA) update services to update software on the vehicle 102. In addition, the telematic devices 226 interface with a positioning system to assist with navigation functions. Other features implemented by the telematic devices 226 include remote diagnostics, and interfacing with emergency response services (e.g., to automatically alert emergency responders in the event of an accident).

A subsystem 202-5 is an advanced driving and safety (ADAS) subsystem of the vehicle system 200. The subsystem 202-5 has two main functions, including implementing an ADAS as well as a perception sensor system. For example, one or more ADAS control devices 230 implement ADAS functionality that includes autonomous or semi-autonomous control, adaptive cruise control, emergency braking, lane centering, and other ADAS functions. One or more perception sensor devices 232 support the ADAS control devices 230 by providing information about the driving environment to ensure safe driving and/or safe interactions with people and other vehicles or machines located in the environment 100. For example, a radar, a camera, a lidar, an ultrasonic sensor, a global position system (GPS) sensor, an inertial measurement unit (IMU), and other sensor technology are examples of the sensor devices 108 that are deployed by the perception sensor devices 232 to collect sensor data about a vehicle environment. Sensor fusion techniques, object detection, lane centering, path trajectory planning, and other perception sensor functions are executed by the perception sensor devices 232 to enable the ADAS functions performed by the ADAS control devices 230.

A subsystem 202-6 is a steering subsystem that controls elements of the vehicle, which steer the wheels. One or more steer control devices 234 integrate with an electric power steering system of the vehicle 102 to control direction of the vehicle wheels. The steer control devices 234 receive inputs from the HMI control devices 220 and/or the control system 204, which are translated into appropriate steering commands for controlling steering actuators that change the direction of the wheels for steering and performing evasive maneuvers.

A subsystem 202-7 represents a body control subsystem of the vehicle 102. Included in the subsystem 202-7 are one or more body control devices 236, which oversee functions related to vehicle body controls. For example, window actuators, door locks and latches, interior and exterior lighting, tailgate and trunk latches, and the like are controlled by the body control devices 236 at the command of the control system 204 and/or one or more of the other subsystems 202 (e.g., the HMI control devices 220).

A subsystem 202-8 is an active suspension control subsystem. One or more suspension control devices 238 implement functions of a suspension control module (SCM) to regulate suspension components to adjust a ride level of the vehicle 102. For example, the suspension control devices 238 configure a vehicle suspension to be stiffer on paved surfaces for improved driving performance and maneuverability. In an offroad setting, the suspension control devices 238 enable a softer suspension setting to provide a smoother ride.

A subsystem 202-9 represents a battery management subsystem of the vehicle 102. One or more battery management devices 240 monitor performance of a battery pack (also referred to as a traction battery) to ensure appropriate charging and discharging rates to promote longevity and overall battery health. The battery management devices 240 control charging operations of on board vehicle batteries as well as controlling battery usage (e.g., to control a rate of discharge). The battery management devices 240 monitor health of vehicle batteries to alert the control system 204 when a malfunction is imminent or occurring.

Finally, a subsystem 202-N is depicted in FIG. 2, which represents a power distribution system. One or more power distribution devices 242 of the subsystem 202-N manage the distribution of electrical power from energy sources on the vehicle 102 to the vehicle system 200. For example, the power distribution devices 242 control power switches, inverters, converters, and other electrical distribution components to ensure the subsystems 202 receive an appropriate level of current and voltage for implementing vehicle functions. The power distribution devices 242 can include fault protection circuits and breakers to interrupt power to a faulty subsystem and maintain safe electrical conditions while the vehicle 102 remains active. The power distribution devices 242 interface with the motor/engine devices 216 and the battery management devices 240 to manage safe electrical conditions throughout the vehicle system 200.

Figure 3:
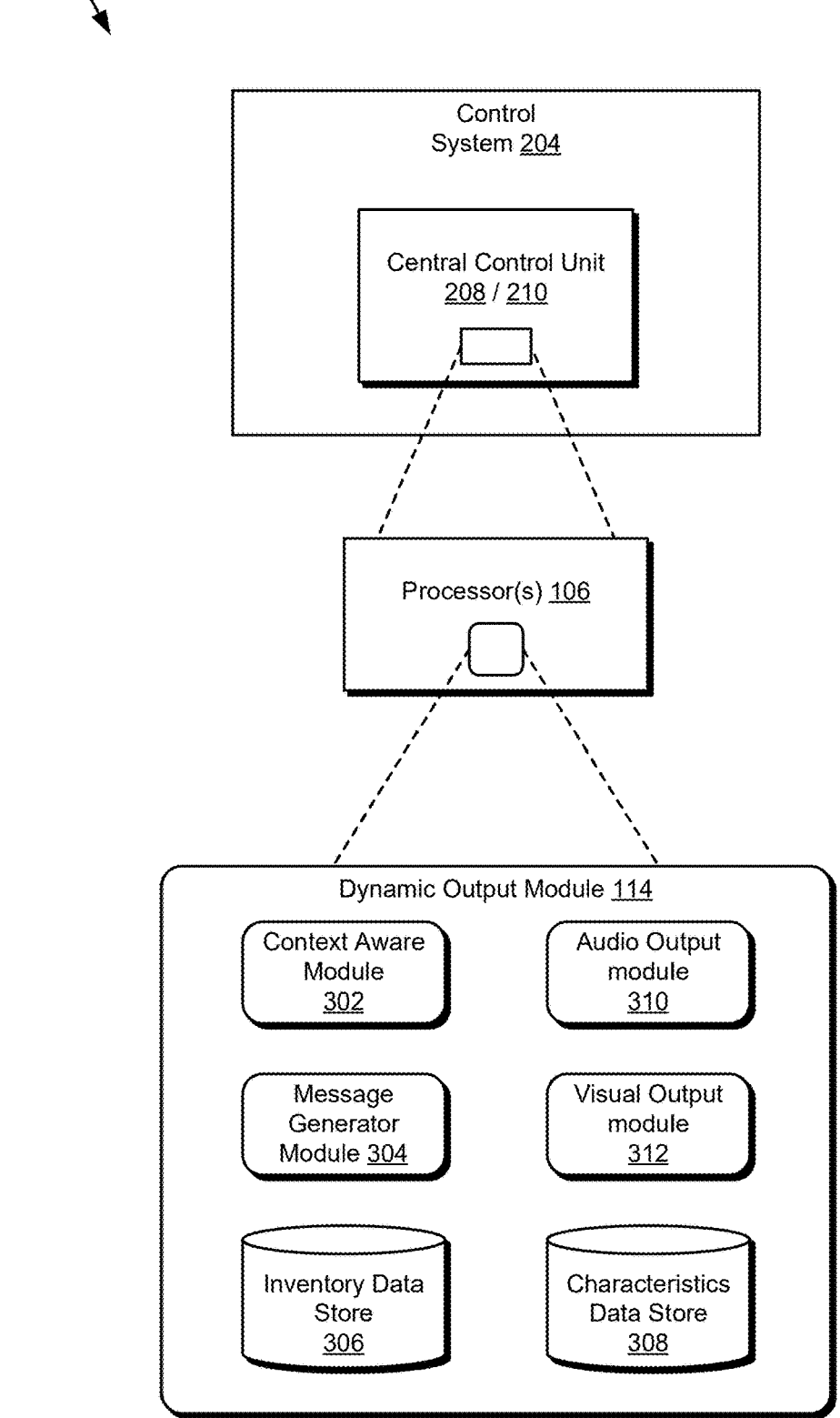
FIG. 3 is a block diagram of a non-limiting example of a dynamic output system configured to generate dynamic outputs for inducing interactions with autonomous vehicles.

FIG. 3 is a block diagram of a non-limiting example of a dynamic output system 300 configured to generate dynamic outputs for inducing interactions with autonomous vehicles. The system 300 is described in the context of the environment 100, including the vehicle 102 and the vehicle system 104, and in the context of the vehicle system 200.

The system 300 includes the control system 204 having the central control unit 208 and the central control unit 210, which incorporate the processors 106. The dynamic output module 114 executes on one or more of the processors 106 to enable the system 300 to generate dynamic outputs for inducing interactions with the vehicle 102. In this example, the dynamic output module 114 includes a context aware module 302, a message generator module 304, an inventory data store 306, a characteristics data store 308, an audio output module 310, and a visual output module 312.

In general, the context aware module 302 determines characteristics of the environment 100 based on information stored in the characteristics data store 308. Based on the characteristics, the context aware module 302 queries the message generator module 304 to determine a message for inducing an interaction between the vehicle 102 and the user 118. The context aware module 302 causes the audio output module 310 and/or the visual output module 312 to synthesize the message generated by the message generator module 304 as the audible signals 116 or visual signals output into the environment 100, which are understandable to the user 118.

The inventory data store 306 maintains information about items and/or services available from the vehicle 102. For example, the inventory data store 306 includes a list of various tools, equipment, and other items for lease or sale (e.g., groceries, snacks, beverages). As items are removed from the vehicle 102, the inventory data store 306 is updated. Likewise, as the vehicle 102 is replenished with additional items, the inventory data store 306 is modified.

The characteristics data store 308 maintains information on the vehicle 102 about characteristics determined for classifying objects in and other aspects of the environment 100. The environment 100 may be represented in the characteristics data store 308 as environmental properties, such as geographic location, time of day, weather conditions, and the like. The characteristics data store 308 may include a list of objects interpreted from the sensor data received from the sensor devices 108 and/or the subsystems 202. Environmental properties and other information about the objects detected in the environment 100 is storable in the characteristics data store 308 as one or more environmental and/or object parameters. One or more examples of the object parameters include a pose, an orientation, a range (e.g., distance between the vehicle 102 and the object), a direction (e.g., an angle between the vehicle 102 and the object), a size, a shape, a classification (e.g., human, pedestrian, cyclist, vehicle, inanimate object, age, gender) and other information is storable in the characteristics data store 308. Examples of the environmental parameters include temperature, precipitation conditions, whether an environment is an urban environment, a rural environment, a construction site, a mining site, a commercial property, a government property, a military site, a street address, and the like. In some examples, the sensor devices 108 and/or the subsystems 202 control the information maintained in the characteristics data store 308. For example, the sensor data generated by the sensor devices 108 is stored in the characteristics data store 308 as the environmental parameters or the object parameters.

The audio output module 310 is operable to communicate with the subsystems 202 (e.g., the HMI input devices 110, the HMI output devices 112) for causing the audible signals 116 to be projected from the vehicle 102 and into the environment 100. The audio output module 310 is managed by the context aware module 302 to cause the audible signals 116 to be output from the vehicle 102 to entice the user 118 to approach the vehicle 102, and to facilitate a human interaction between the user 118 and the vehicle 102. For example, the audio output module 310 commands the HMI output devices 112 to generate a soundscape in the environment 100 that provides an indication of a location of the vehicle 102 and a purpose for the vehicle 102 being present at that location.

The visual output module 312 is likewise operable to communicate with the subsystems 202 (e.g., the HMI input devices 110, the HMI output devices 112) for causing visual signals to be projected from the vehicle 102 and into the environment 100. The visual output module 312 is managed by the context aware module 302 to cause the visual signals to be output from the vehicle 102 to entice the user 118 to approach the vehicle 102, and to facilitate a human interaction between the user 118 and the vehicle 102. For example, the visual output module 312 commands the HMI output devices 112 to display a GUI outside the vehicle 102, control exterior lights on the vehicle 102, or otherwise enhance the soundscape (e.g., the audible signals 116) being broadcast in the environment 100 to bring further awareness to the user 118 of the location and purpose of the vehicle 102 being nearby.

In one or more implementations, the message generator module 304 uses machine-learning to determine messages that can be used to support outputs broadcast from the vehicle 102 for inducing human interactions with the vehicle 102 in different environments. For example, the message generator module 304 shares an interface with the context aware module 302 to receive queries for messages or content that is likely to entice users to the vehicle 102 for facilitating human interactions intended for the vehicle 102.

The context aware module 302 orchestrates operations of the message generator module 304, the audio output module 310, and the visual output module 312 for facilitating user interactions with the vehicle 102. For example, when the vehicle 102 arrives at a stop or destination where interaction with the user 118 is desired, the context aware module 302 performs operations for generating content or messaging conveyed in the audible signals 116 and/or visual signals projected in the environment 100. The context aware module 302 selects information from the inventory data store 306 based on information maintained in the characteristics data store 308 and queries the message generator module 304 for determining a message about the inventory that is relevant to the environment 100.

The context aware module 302 may implement machine-learning to generate the queries for the message generator module 304. For example, the context aware module 302 may execute a machine-learning model that accesses the inventory data store 306 and the characteristics data store 308 to determine suitable queries for the message generator module 304 given a current context of the environment 100.

Through machine-learning, the context aware module 302 and/or the message generator module 304 are each configurable to implement a variety of functionalities. Examples of these functionalities include an ability to execute operations to achieve a goal (e.g., to determine a query, to determine an answer to a query), understand and breakdown questions, and to generate messages or content in furtherance of tasks implemented by the dynamic output module 114. The message generator module 304 may be an artificial intelligence (AI) platform (e.g., an AI agent) configured to receive natural language inputs that convey questions about selling or leasing items contained in the list of items maintained in the inventory data store 306. The context aware module 302 may provide another AI platform (e.g., another AI agent) configured to generate the natural language inputs that convey questions to the message generator module 304. Based on the inputs received by the message generator module 304, a message is output to the context aware module 302 for use in synthesizing the audible signals 116 and/or visual signals as outputs from the vehicle 102 that are likely to cause an interaction with the user 118.

The context aware module 302 and/or the message generator module 304 may be trained (e.g., supervised, self-supervised) or programmed, e.g., with data maintained in computer-readable storage media of the vehicle 102, with data maintained on the Internet, with data provided from a cloud-platform or a cloud service, and/or with data maintained on the vehicle 102 (e.g., the inventory data store 306, the characteristics data store 308). For example, the user 118 may have a social media profile or an online presence that the context aware module 302 and/or the message generator module 304 can access to develop a user profile of the user 118 indicative of their interests, demographics, and other information available for personalizing a user experience between the vehicle 102 and the user 118. As one example, a particular genre of music or voice may be used as a soundscape projected through the audible signals 116. In one or more implementations, the online presence of the user 118 may indicate past user experiences with the vehicle 102 or other similar vehicles. In other words, the context aware module 302 and/or the message generator module 304 may rely on information about one or more human objects, such as the user 118, to include information obtained from a cloud service or platform indicative of one or more of personal preferences (e.g., of the user 118), a social media presence (e.g., of the user 118), and previous vehicle interactions (e.g., between the user 118 and the vehicle 102 or another autonomous vehicle). The context aware module 302 and/or the message generator module 304 causes interactions (e.g., soundscapes, audible signals, visual signals) to be similar to favorable previous user experiences and dissimilar from occurrences when the user 118 was less satisfied with a vehicle interaction. In one or more examples, the context aware module 302 and/or the message generator module 304 executes a large language model (LLM) trained and retrained (e.g., using machine learning) to have an overall understanding about how humans communicate to entice one another to make purchases, approach closer, or otherwise understand the purpose for the vehicle 102 being nearby. For example, the context aware module 302 and/or the message generator module 304 includes one or more machine-learning models (e.g., neural networks) configured as one or more LLM for learning statistical relationships associated with the language of the user 118 in the environment 100 through execution of computationally intensive self-supervised and semi-supervised training processes.

As used herein, the term "machine-learning model" refers to a computer representation that is tunable (e.g., through training and retraining) based on inputs without being actively programmed by a user to approximate unknown functions, automatically and without user intervention. In particular, the term machine-learning model includes a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, generative adversarial networks (GANs), decision trees, support vector machines, linear regression, logistic regression, Bayesian networks, random forest learning, dimensionality reduction algorithms, boosting algorithms, deep learning neural networks, etc.

As one example, the context aware module 302 queries the characteristics data store 308 to determine that the environment 100 includes a location of a mining operation or a construction site. The context aware module 302 queries the inventory data store 306 to determine that several hand tools, safety equipment, and other items to help miners or construction workers perform their jobs in the environment 100. When the vehicle 102 stops in the environment 100, it may go unnoticed to these workers due to loud noise and large obstructions caused by mining or construction equipment operating nearby. The context aware module 302 sends a query to the message generator module 304 asking for a message to entice workers at the mining or construction location to be made aware of the tools and safety equipment available from the vehicle 102. In response to outputting the query to the message generator module 304, the context aware module 302 receives a message (e.g., text) with instructions on how to convey the message in an effective manner. For example, the context aware module 302 receives text of a phrase "Robotic delivery is on-site. Visit the vehicle to swap out your old tools and safety gear" or "Your company workshop on wheels is here to provide all the equipment for keeping you safe and productive, stop by". In addition, the context aware module 302 receives a song, a melody, or soundscape recommendation from the message generator module 304 to accompany the message for encouraging the workers to engage with the vehicle 102 (e.g., the melody may be similar to the song Whistle While You Work). The context aware module 302 controls the audio output module 310 to deliver the message from the vehicle 102. For example, the audio output module 310 synthesizes the message into the audible signals 116 with the messages being accompanied by the recommended soundscape. The HMI output devices 112 may project the audible signals 116 containing the synthesized message received from the audio output module 310 into the environment 100.

In one or more examples, the context aware module 302 is operable to obtain feedback from the environment 100 and adjust operations of the vehicle 102 based on the feedback. For example, in response to causing the audible signals 116 to be output from the HMI output devices 112, the context aware module 302 maintains a timer for measuring an amount of time that goes by without any interactions between the vehicle 102 and the user 118. In response to determining that the amount of time exceeds a time threshold, the context aware module 302 determines that the audible signals 116 failed to attract the attention of the user 118. The context aware module 302 causes the audible signals 116 to be output a second time. In some cases, the message conveyed by the audible signals 116 is adjusted when output for the second time to more likely cause the user 118 to interact with the vehicle 102. For example, the audible signals 116 are output with a higher sound volume, or their output is directionally controlled and broadcast towards the user 118 to increase a likelihood of the audible signals 116 being heard.

In some examples, the context aware module 302 is configured to dynamically generate the audio output to be a first type of audio generated for a first environment of two or more different environments, and dynamically generate the audio output to be a different type of audio generated for a second environment of the two or more different environments. For example, imagine that the vehicle 102 stops at a first construction site where the HMI input devices 110 detect workers speaking English. The context aware module 302 causes the audio output from the vehicle 102 to be conveyed in English to be more likely to attract attention of the English speaking workers. Later, the vehicle stops at a second construction site where the HMI input devices 110 detect other workers speaking French or Spanish. The context aware module 302 may thereby learn to cause the audio output from the vehicle 102 to be conveyed in the language detected being spoken in the environment 100, as a way to be more likely to attract people that are nearby.

Numerous inferences about the people near the vehicle 102 may be made from the feedback received from the environment 100, which enables the context aware module 302 to request a message from the message generator module 304 that is more appealing or appropriate for the current circumstances. For example, image the vehicle 102 is delivering groceries to a neighborhood. In response to detecting children laughing or playing nearby, the context aware module 302 queries the message generator module 304 for a message about the inventory on the vehicle 102, which is appealing to a child. For example, the context aware module 302 receives text of a phrase "Cold and creamy milk for you, fresh from Old McDonald's farm E-I-E-I-O". As another example, in response to detecting an adult tending to a garden, the context aware module 302 queries the message generator module 304 for a more age appropriate and appealing message for a gardener about the inventory on the vehicle 102. For example, the context aware module 302 receives text of a phrase "Organic salad dressing onboard to enhance the flavor of your garden salad" or "Are you running out of weed blocking fabric? You can buy more from me." In either case, the context aware module 302 controls the audio output module 310 to deliver the messages from the vehicle 102 as a soundscape that is appealing (e.g., in an age-appropriate manner, in a familiar language) to a target audience for consumables on board the vehicle 102.

Figure 4:
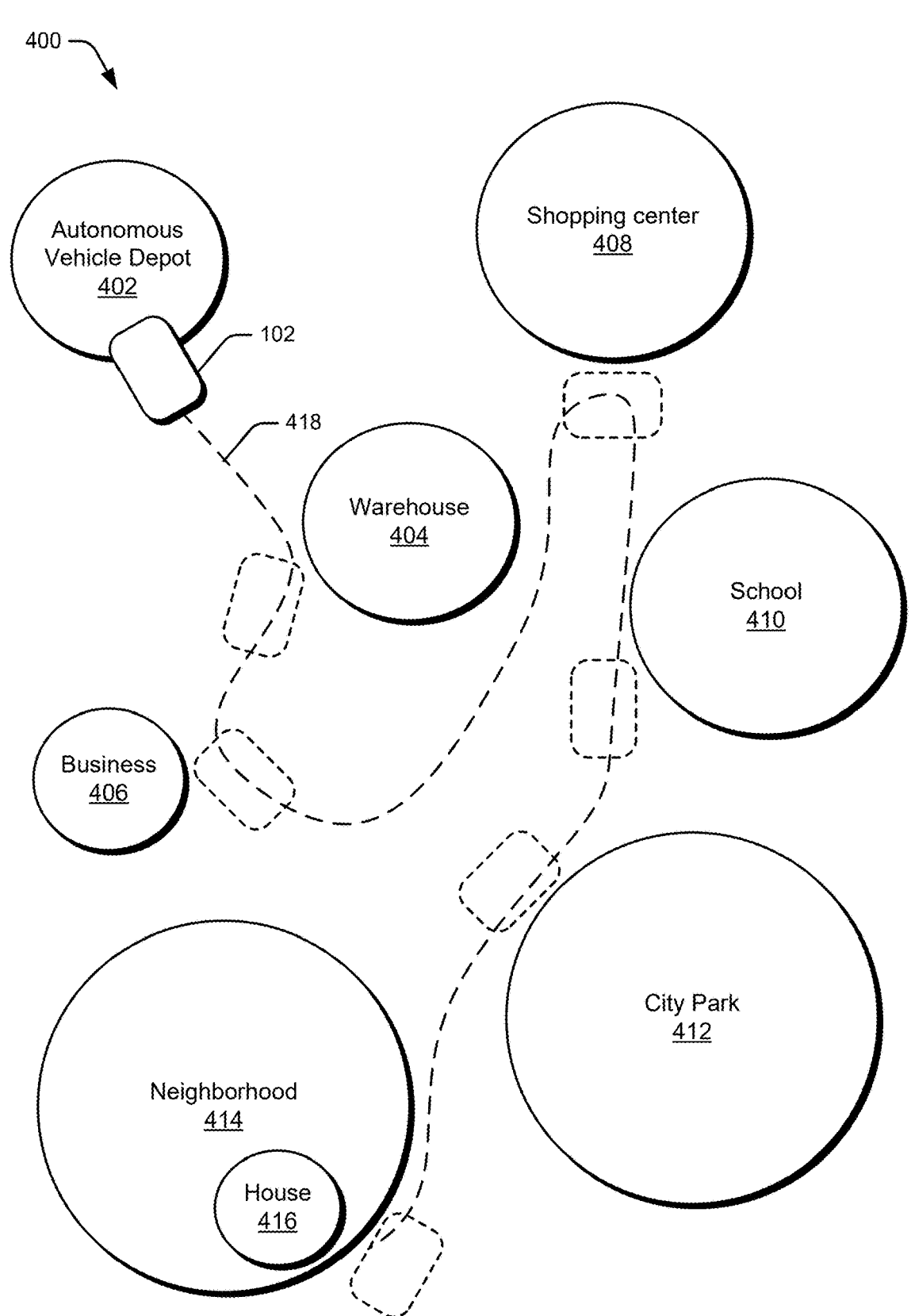
FIG. 4 depicts a non-limiting example scenario of an autonomous ground vehicle that generates dynamic outputs for inducing interactions with humans.

FIG. 4 depicts a non-limiting example scenario 400 of an autonomous ground vehicle that generates dynamic outputs for inducing interactions with humans. The scenario 400 is described in the context of the vehicle 102, the vehicle system 104, the vehicle system 200, and the system 300.

For example, imagine a merchant that deploys the vehicle 102 into a city. The vehicle 102 may be programmed at an autonomous vehicle depot 402 to make several stops in the city for delivering merchant goods or services. As depicted in FIG. 4, a first stop is at a warehouse 404, a second stop is at a business 406, a third stop is at a shopping center 408, a fourth stop is at a school 410, a fifth stop is at a city park 412, and a final stop is at house 416 in a neighborhood 414. The vehicle 102 may be programmed to take a particular route 418 such that the vehicle arrives at each of the various stops at different times throughout the day.

After leaving the autonomous vehicle depot 402 the vehicle 102 travels along the route 418 to arrive at the warehouse 404. The vehicle 102 may arrive at the warehouse 404 outside of a scheduled time so employees may not notice its arrival. To keep its schedule and have sufficient time to visit each of the scheduled stops, the vehicle 102 is operable to generate dynamic outputs to signal its arrival and availability to be loaded with merchandise stored in the warehouse 404. For example, the dynamic output module 114 configures the HMI output devices 112 to generate a soundscape with a message crafted by the message generator module 304 to indicate the vehicle 102 is "waiting at the dock to be loaded" with background music to the sound of a game show (e.g., Jeopardy™). Employees at the warehouse notice the game show music and go to the dock where the vehicle 102 is waiting with open cargo doors to receive the merchandise.

In response to determining that the inventory data store 306 is updated to indicate the merchandise is secured onboard the vehicle 102, the dynamic output module 114 configures the HMI output devices 112 to generate different soundscape with a different message crafted by the message generator module 304 to indicate the interaction with the employees at the warehouse 404 is concluded. The vehicle 102 outputs the audible signals 116 to convey "thank you for your help-you are an efficient team of loaders!"

The business 406 may be a local florist and the vehicle 102 leaves the warehouse 404 and travels on the route 418 before arriving at a loading dock where a robotic arm is deployed from the vehicle 102 to neatly arrange a delivery of flowers, pots, fertilizer, and other supplies removed by the robotic arm from a cargo pod on the vehicle 102. Employees may normally meet the vehicle 102 outside to take immediate possession of the items delivered to the loading dock to be added to the florist's inventory. However, the vehicle 102 may arrive at the business 406 during a busy time when employees are helping customers. Even though the vehicle 102 may be automated to deliver its cargo without help from the employees, the fresh flowers may spoil if they do not notice the arrival at the loading dock. The vehicle 102 is operable to generate dynamic outputs to signal its arrival and prevent this spoliation. For example, the dynamic output module 114 configures the HMI output devices 112 to generate a soundscape with the florist's sales jingle to indicate the merchandise is outside. Employees at the florist take notice of the florist's jingle and go to the dock to receive the delivery and bring the items inside.

The next stop on the route 418 is the shopping center 408 where the vehicle 102 is programmed to sell fresh flowers under the brand name of the florist, which are not offered for sale by any of the shops located nearby. With permission from the shopping center 408, the vehicle 102 parks outside and generates the audible signals 116 from the HMI output devices 112 to play the florist's jingle. A customer (e.g., the user 118) may notice the music playing from the vehicle 102 and instead of walking to their car after leaving the shopping center 408, the customer walks towards the vehicle 102. The dynamic output module 114 detects the change in the characteristics of the environment 100 that indicate the customer approaching and changes its tune to include a message generated by the message generator module 304 to acknowledge the presence of the customer (e.g., "That's right, fresh flowers are available here for your convenience, step right up to purchase here and save time from driving elsewhere").

In at least one example, the vehicle 102 controls a display that presents a kiosk interface to the customer when the characteristics data store 308 indicates that the user 118 is looking to make a floral selection. After providing payment to the kiosk interface for a bouquet, the vehicle 102 opens the cargo doors to allow the user 118 to take their merchandise and finish the deal. In some examples, the dynamic output module 114 determines that one or more of the items being transported by the vehicle 102 are removed from the inventory (e.g., based on an update to the inventory data store 306). In response to detecting the change in the inventory, the dynamic output module 114 causes the HMI output devices 112 to dynamically generate an additional audio output for indicating feedback about the one or more items that are removed from the inventory. For example, the context aware module 302 queries the message generator module 304 for a message to deliver to the customer about how to take care of the bouquet to prolong freshness. The message generator module 304 responds to the query with text of a message that states, "Don't forget to put the flowers in a vase filled with water right away or keep them in a cool place if you have more errands to run to prevent them from spoiling."

After the shopping center 408, the vehicle 102 travels on the route to the school 410. The vehicle 102 arrives just as the school 410 is closing and students are heading home. The vehicle 102 parks along a sidewalk and outputs a GUI showcasing a catalogue of books and magazines for display on a vehicle exterior. Customers can approach the vehicle 102 to interact with the GUI to select titles for purchase and provide payment. The student customers may take delivery from a vehicle compartment that automatically opens to reveal their chosen books. However, on this occasion, the vehicle 102 may be obscured from a distance by other vehicles parked along the sidewalk (e.g., parents, school busses) and may otherwise fail to attract student-customers that walk in one direction or another.

With permission from the school 410, the vehicle 102 generates the audible signals 116 from the HMI output devices 112 to play a genre of music (e.g., rock, rap, pop, country) that is appealing to the students with an intermittent synthesized audio message about "final exam study guides and other books for sale." A customer may first hear the music and then the message broadcast from the vehicle 102 and instead of walking in an opposite direction, walk towards the vehicle 102. The dynamic output module 114 detects the change in the characteristics of the environment 100 that indicate the customer approaching and changes its tune to include a message generated by the message generator module 304 to acknowledge the presence of the customer (e.g., "You are clearly smarter than your peers, come closer and see how we can make studying a breeze").

In some examples, the message generator module 304 is operable to generate messages for the context aware module 302 that are to be spoken in a celebrity voice when output from the HMI output devices 112 to be more appealing to the target customers. For example, a famous athlete may lend their voice to the vehicle 102 (e.g., from a contract or license relationship between the athlete and the merchant owner of the vehicle 102). When the vehicle 102 is outside the school 410, the message conveyed in the audible signals 116 may appear as if that athlete is talking directly to the students.

In some implementations, visual signals are simultaneously projected from the vehicle 102 with the audible signals 116. For example, the GUI may display a computer generated video of an avatar that simulates the appearance of the athlete speaking the message conveyed by the audible signals 116. That is, the context aware module 302 may query the message generator module 304 for a short clip of the athlete speaking to students about getting their study guides from the vehicle 102 instead of waiting for an online purchase to be delivered close to the exam date. The context aware module 302 may cause the dynamic output module 114 to dynamically generate audible and visual outputs for inducing human interactions with the autonomous vehicle 102. By controlling their output from the audio output module 310 and the visual output module 312, the HMI output devices 112 are configured to simultaneously transmit the audible and visual outputs as the audible signals 116 and the visual signals on the GUI for facilitating a human interaction with the vehicle 102.

A next stop on the route 418 is at the city park 412 where families are having picnics or enjoying a playground. The vehicle 102 arrives at the park an inventory filled with groceries and other items for sale to help people enjoy the park. However, when the vehicle 102 arrives at the city park 412, its presence may be masked by shrubs, trees, or other environmental features and fail to gain the attention of any customers. Having previously been to the city park 412 on a different day, the context aware module 302 uses machine-learning to determine a message for output from the vehicle 102 that is likely to attract the customers more quickly than before. That is, rather than outputting music that is not likely to gain attention of park patrons from a far vantage point, the vehicle 102 causes the HMI output devices 112 to flash its lights in particular way to put on a light show. Upon detecting with the sensor devices 108 that a change in characteristics of the environment 100 indicate a person is walking towards the vehicle 102, the dynamic output module 114 may supplement the light show with a directed audio message for the person to keep moving closer. For example, the context aware module 302 controls the audio output module 310 to cause the HMI output devices 112 to transmit the audible signals 116 as a synthesized voice that speaks a message "Get your frozen treats and refreshments before I have to move to my next stop!"

Then, as twilight settles over the city, the vehicle 102 may enter the neighborhood 414 and pull up to the house 416 where a birthday celebration is underway. The vehicle 102 may transform into a mobile DJ platform where the vehicle 102 plays music and/or controls a light show that is choreographed to the rhythm. The vehicle 102 may help the hosts to keep the party going by automatically summoning another autonomous vehicle to the house with a delivery of additional drinks and snacks. For example, the context aware module 302 determines that the inventory data store 306 is low on snacks or refreshments, which were depleted by the park patrons. The context aware module 302 outputs a V2V message to other autonomous vehicles in the area to attract them to the house 416. This way, the merchant can supplement the DJ services provided by the vehicle 102 with merchandise sales by other autonomous vehicles in the merchant's fleet.

In some examples, when the vehicle transitions to the mobile DJ platform, the residents may not understand how to control the vehicle 102 to adjust the volume or signal the vehicle 102 that it is parked at a wrong house. The context aware module 302 may determine from the characteristics data store 308 that people detected outside the vehicle 102 are presenting gesture, exhibiting body language, or voicing comments about being unhappy or displeased with the vehicle 102. The context aware module 302 may pause the music and communicate a message from the HMI output devices 112 that tells the residents that they can talk to the vehicle 102 and it will understand their commands. After receiving feedback from the residents outside the vehicle 102 that the party is across the street and not at their house, the dynamic output module 114 outputs a reply stating "thank you for letting me know, I will move across the street. For your troubles, please take a coupon for a free item the next time you see me in your area," as a printing device on the vehicle 102 dispenses the coupon.

FIG. 5 depicts a procedure 500 for generating dynamic outputs for inducing interactions with autonomous vehicles. The procedure 500 includes multiple operations illustrated as block 502 through block 506 and provides just one example procedure performed within any of the previously described systems (e.g., the vehicle system 104, the vehicle system 200, the system 300). The procedure 500 is not limited to the order of operations shown in FIG. 5, other orderings of the block 502 through the block 506 are possible. In one or more implementations, the procedure 500 includes additional or fewer operations than those depicted in FIG. 5.

The procedure 500 starts with one or more characteristics of an environment outside an autonomous vehicle being detected (block 502). For example, when the vehicle 102 arrives at the neighborhood 414, the sensor devices 108 cause an update to the characteristics data store 308 to indicate that the environment 100 is a residential neighborhood and that it is a hot sunny day with people detected in their yards doing various activities (e.g., playing games, mowing grass).

The procedure 500 continues with an audio output being dynamically generated based on the characteristics for inducing human interactions with the autonomous vehicle (block 504). As one example, the context aware module 302 queries the message generator module 304 to produce a message for selling yard game items indicated in the inventory data store 306 given the prevalence of people outside enjoying the hot sunny day. The message generator module 304 outputs a text message reply for the message generator module 304 to use as a soundscape for drawing the people's attention to the presence of the vehicle 102. For example, the message generator module 304 outputs a message "Cool off with a water balloon fight with your neighbors! Huge selection of these and other items for your convenience."

The procedure 500 finishes with an output device of the autonomous vehicle being caused to transmit the audio output as audible signals produced in the environment for facilitating a human interaction with the autonomous vehicle (block 506). For example, the context aware module 302 causes the audio output module 310 to synthesize the message received from the message generator module 304 to produce the audible signals 116 that are output from the HMI output devices 112 to indicate the water balloons and other items for sale.

In at least one example, the HMI input devices 110 are activated while the HMI output devices 112 generate the audible signals. The HMI input devices 110 configure the vehicle 102 to be listening to what people are saying and processing their feedback to enable the dynamic output module 114 to learn from the environment 100 and improve the message output from the HMI output devices 112. For example, one of the neighborhood residents may tell a friend "I wonder if the vehicle has those red, white, and blue popsicles that are my favorite." In response to the sensor devices 108 picking up the comment from the resident, the context aware module 302 queries the message generator module 304 for a new message explaining the refreshments and snacks listed in the inventory data store 306 that are like the red, white, and blue popsicles spoken about. For example, the message generator module 304 outputs an updated message "If you are not wanting to get wet, we have more than balloons including an assortment of as well as red, white, and blue snow cones, as well as other snacks and treats." The resident may then approach the vehicle 102 and purchase a snow cone while talking to a friend stating, "I like this even better than those popsicles". The HMI input devices 110 share the user feedback with the dynamic output module 114 to enable the dynamic output module 114 to learn, for the next time the vehicle 102 is in the neighborhood 414, to initially broadcast a similar message about the snow cones before trying to sell the water balloons.

Many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the dynamic output module 114, the context aware module 302, the message generator module 304, the inventory data store 306, the characteristics data store 308, the audio output module 310, the visual output module 312) are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a DSP, a GPU, a parallel accelerated processor, a plurality of microprocessors, one or more microprocessors in association with a DSP core, a controller, a microcontroller, Application Specific Integrated Circuits (ASICs), FPGAS, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a ROM, a RAM, a register, cache memory, semiconductor memory devices, magnetic media such as internal hard disks and removable disks, magneto-optical media, and optical media such as CD-ROM disks, and digital versatile disks (DVDs).

What is claimed is:

1. A system comprising:
an output device configured to produce audible signals in an environment outside an autonomous vehicle; and
at least one processor operatively coupled to the output device and configured to:
detect one or more characteristics of the environment;
dynamically generate, based on the characteristics, an audio output for inducing human interactions with the autonomous vehicle using a machine-learning model to generate a spoken audio portion of the audio output that uses a spoken language detected based on the characteristics; and
cause the output device to transmit the audio output including the spoken audio portion as the audible signals produced in the environment for facilitating a human interaction with the autonomous vehicle.

2. The system of claim 1, wherein the at least one processor is further configured to:
detect a change to the characteristics in response to the audio output; and
modify the audio output based on the change to produce a new output for further inducing the human interactions with the autonomous vehicle, the change indicating changes in at least one of:
relative distance between the autonomous vehicle and a human object;
relative direction or orientation between the autonomous vehicle and the human object; or
behavior or feedback of the human object.

3. The system of claim 1, wherein:
the at least one processor is further configured to use the machine-learning model to determine different outputs for inducing human interactions with the autonomous vehicle in two or more different construction or mining environments to retrieve construction or mining materials, tools, and safety equipment from an inventory of the autonomous vehicle; and the audio output includes a synthesized message indicating availability of the inventory in at least one of the two or more different construction or mining environments.

4. The system of claim 1, wherein the at least one processor is further configured to:
dynamically generate the audio output to be a first type of audio generated in a first spoken language for a first environment two or more different environments; and
dynamically generate the audio output to be a different type of audio generated in a second spoken language for a second environment of the two or more different environments.

5. The system of claim 1, wherein the at least one processor is further configured to:
determine an inventory of items transported by the autonomous vehicle; and
dynamically generate the audio output for inducing human interactions with the autonomous vehicle based further on a change to the inventory that triggers a dynamically generated audio output for indicating feedback about one or more items that are removed from the inventory.

6. The system of claim 1, wherein the at least one processor is further configured to:
determine a location of the environment; and
dynamically generate the audio output for inducing human interactions with the autonomous vehicle based further on the location.

7. The system of claim 5, wherein the at least one processor is further configured to:
determine that one or more of the items being transported by the autonomous vehicle are removed from the inventory; and
dynamically generate an additional audio output for indicating feedback about the one or more items that are removed from the inventory.

8. The system of claim 1, wherein the at least one processor is further configured to:
receive messages from a large language model configured to dynamically generate text; and
synthesize the messages as the audio output for inducing human interactions with the autonomous vehicle.

9. The system of claim 1, wherein the characteristics detected by the at least one processor include information about at least one of:
time of day for the environment;
weather detected in the environment; or
one or more human objects detected in the environment, including position of the human objects, motion of the human objects, shape of the human objects, and size of the human objects.

10. The system of claim 9, wherein the information about one or more human objects includes information obtained from a cloud service or platform indicative of one or more of personal preferences, a social media presence, and previous vehicle interactions, and the characteristics detected by the at least one processor include information about one or more inanimate objects detected in the environment, and the inanimate objects comprise at least one of other vehicles, buildings, driving surfaces, sidewalks, signs, awnings, flags, trees, or rocks.

11. The system of claim 1, further comprising:
a sensor system configured to generate sensor data indicative of the characteristics detected by the at least one processor, wherein the sensor system comprises one or more of a camera sensor, a lidar sensor, a radar sensor, an ultrasonic sensor, a location positioning sensor, a temperature sensor, a pressure sensor, and a communication sensor.

12. The system of claim 9, wherein the at least one processor is further configured to:

modify intensity or direction of the audible signals when a timer exceeds a time threshold for further facilitating the human interaction with the autonomous vehicle by directionally controlling the audible signals to be broadcast toward the position of the human objects.

13. The system of claim 1, wherein the output device comprises a first output device, the system further comprising:

a second output device configured to produce visual signals in the environment from a position inside or outside the autonomous vehicle, wherein the at least one processor is operatively coupled to the second output device and further configured to:

dynamically generate, based on the characteristics, a visual output for inducing the human interactions with the autonomous vehicle, the visual output including a graphical user interface (GUI) configured to present a kiosk interface for taking possession of an item from the autonomous vehicle when the characteristics indicate a human object is positioned to take the item; and cause the second output device to transmit the visual output as the visual signals produced in the environment for facilitating the human interaction with the autonomous vehicle.

14. The system of claim 13, wherein the at least one processor is configured to;

control the first output device and the second output device to simultaneously transmit the audio output and the visual output in the environment for facilitating the human interaction with the autonomous vehicle by simultaneously transmitting the audio output and the visual output by producing a light show with the second output device that is based on a rhythm of the audio output produced by the first output device to attract human objects when the characteristics indicate no human objects are approaching the autonomous vehicle.

15. The system of claim 13, wherein the at least one processor is further configured to:

detect gesture or body language from the characteristics indicating a displeased user with the autonomous vehicle; and cause the output device to transmit a modified audio output addressing the displeased user.

16. An autonomous vehicle comprising:

a first output device configured to produce audible signals in an environment outside an autonomous vehicle;

a second output device configured to produce visual signals in the environment outside the autonomous vehicle; and at least one processor operatively coupled to the first output device and the second output device, and configured to:

detect one or more characteristics of the environment;

dynamically generate, based on the characteristics, audible outputs and visual outputs for inducing human interactions with the autonomous vehicle using a machine-learning model to generate a spoken audio portion of the audible outputs that uses a spoken language detected based on the characteristics, and wherein the visual outputs include an avatar synchronized to speak the spoken audio portion; and cause the first output device and the second output device to simultaneously transmit the audible outputs and the visual outputs as the audible signals and the visual signals produced in the environment for facilitating a human interaction with the autonomous vehicle.

17. The autonomous vehicle of claim 16, wherein the at least one processor is further configured to:

dispense a digital or printed coupon in response to detecting a change in the characteristics indicating completion of a human interaction with the autonomous vehicle.

18. A non-transitory computer-readable storage medium comprising instructions that, when executed, cause at least one processor of an autonomous vehicle to:

detect one or more characteristics of an environment outside the autonomous vehicle;

dynamically generate, based on the characteristics, an audio output for inducing human interactions with the autonomous vehicle using a machine-learning model to generate a spoken audio portion of the audio output that uses a spoken language detected based on the characteristics; and cause an output device of the autonomous vehicle to transmit the audio output including the spoken audio portion as audible signals produced in the environment for facilitating a human interaction with the autonomous vehicle.

19. The non-transitory computer-readable storage medium of claim 18, wherein the computer-readable storage medium is installed in the autonomous vehicle.

20. The non-transitory computer-readable storage medium of claim 18, wherein the instructions further cause the at least one processor to:

process feedback received via one or more human machine interface (HMI) input devices to train the machine-learning model to learn to improve the audio outputs.

* * * * *